(12) United States Patent
Han

(10) Patent No.: US 11,720,521 B2
(45) Date of Patent: Aug. 8, 2023

(54) TOPOLOGIES AND ALGORITHMS FOR MULTI-PROCESSING UNIT INTERCONNECTED ACCELERATOR SYSTEMS

(71) Applicant: Alibaba Singapore Holding Private Limited, Singapore (SG)

(72) Inventor: Liang Han, Campbell, CA (US)

(73) Assignee: Alibaba Singapore Holding Private Limited, Singapore (SG)

( * ) Notice: Subject to any disclaimer, the term of this patent is extended or adjusted under 35 U.S.C. 154(b) by 0 days.

(21) Appl. No.: 17/216,024

(22) Filed: Mar. 29, 2021

(65) Prior Publication Data

US 2022/0309024 A1 Sep. 29, 2022

(51) Int. Cl.
*G06F 15/173* (2006.01)
*G06F 13/40* (2006.01)

(52) U.S. Cl.
CPC .... *G06F 15/17318* (2013.01); *G06F 13/4027* (2013.01)

(58) Field of Classification Search
None
See application file for complete search history.

(56) References Cited

U.S. PATENT DOCUMENTS

| | | | | |
|---|---|---|---|---|
| 8,161,268 B2 * | 4/2012 | Faraj | ......................... | G06F 9/54 712/30 |
| 8,458,244 B2 * | 6/2013 | Blocksome | ....... | G06F 15/17387 712/30 |
| 8,752,051 B2 * | 6/2014 | Archer | ................... | G06F 9/4843 718/100 |
| 2004/0103218 A1 * | 5/2004 | Blumrich | ................ | G06F 9/526 709/249 |
| 2011/0219208 A1 * | 9/2011 | Asaad | ........................ | G06F 9/06 712/12 |
| 2019/0312772 A1 * | 10/2019 | Zhao | ........................ | H04L 41/12 |

(Continued)

Primary Examiner — Michael Sun

(57) ABSTRACT

An accelerator system can include one or more clusters of eight processing units. The processing units can include seven communication ports. Each cluster of eight processing units can be organized into two subsets of four processing units. Each processing unit can be coupled to each of the other processing units in the same subset by a respective set of two bi-directional communication links. Each processing unit can also be coupled to a corresponding processing unit in the other subset by a respective single bi-directional communication link. Input data can be divided into one or more groups of four subsets of data. Each processing unit can be configured to sum corresponding subsets of the input data received on the two bi-directional communication links from the other processing units in the same subset with the input data of the respective processing unit to generate a respective set of intermediate data. Each processing unit can be configured to sum a corresponding set of intermediate data received on the one bi-directional communication link from the corresponding processing unit in the other subset with the intermediate data of the respective processing unit to generate respective sum data. Each processing unit can be configured to broadcast the sum data of the respective processing unit to the other processing units in the same subset on the respective sets of two bi-directional communication links.

10 Claims, 10 Drawing Sheets

(56) References Cited

U.S. PATENT DOCUMENTS

2020/0294181 A1* 9/2020 Matam .................... G06T 1/20
2020/0301876 A1 9/2020 Hamlin
2021/0089353 A1 3/2021 Shear et al.

* cited by examiner

TOPOLOGIES AND ALGORITHMS FOR MULTI-PROCESSING UNIT INTERCONNECTED ACCELERATOR SYSTEMS

BACKGROUND OF THE INVENTION

A current methodology for parallel/distributed training of deep neural networks includes applying synchronized large minibatch stochastic gradient descent (SDG) processing on many distributed computing nodes to explore data parallel based acceleration. Referring to FIG. 1, an exemplary minibatch SDG process, including pseudo code, for running on a CPU host is illustrated. The process is subject to the synchronization parts bottlenecking the whole process of parallel acceleration. To reduce bottlenecking, building up the bandwidth of an accelerator-side network and/or reducing the frequency of host accelerator communication is needed, as illustrated in FIG. 2.

There are a number of algorithms for the synchronization of minibatch SDG processing. Some common inter-computing-note communication mode functions are the Reduce and All_Reduce functions. Referring now to FIG. 3, the Reduce function is illustrated. In the Reduce function, a set of values of each of a plurality nodes 310-340 are passed to a given one 310 of the plurality of nodes 310-340, which adds the respective values together. The sum of the set of values is stored by the given node 310. For example, a first node 310 adds the values of 5, 2, 7 and 4 received from the plurality of nodes 310-340 together, and the first node 310 stores the resulting sum of 18. The first node 310 also adds the values of 1, 3, 8 and 2 together and stores the resulting sum of 14. Referring now to FIG. 4, the All-Reduction function is illustrated. In the All_Reduce function, a set of values of each of a plurality of nodes 410-440 are passed to a given one 410 of the plurality of nodes 410-440, which add the respective values together. The set of sum values is broadcast by the given node 410 to the plurality of nodes 410-440, and the plurality of nodes 410-440 store the set of sum values. For example, a first node 410 adds the values of 5, 2, 7 and 4 received from the plurality of nodes 410-440 together. The first node 410 also adds the values of 1, 3, 8 and 2 together. The first node 410 broadcast the set of sum values of 18 and 14 to the plurality of nodes 410-440, which each store the set of sum values. As illustrated, the Reduce function and All_Reduce function are applied to a bunch of variables simultaneously.

Although a straightforward topology implementation of the Reduce and All_Reduce functions is a tree-based implementation, ring-based implementation can achieve a higher bandwidth utilization rate and efficiency. Referring now to FIG. 5, a conventional ring-based All_Reduce implementation on a distributed computing system is illustrated. In the All_Reduce function, each of N nodes of a distributed computing system communicate with two of its peer nodes $2*(N-1)$ times. During the communications, a node sends and receives set of values. In the first $N-1$ iterations, received values are added to the values in the respective nodes' buffers. In the second $N-1$ iterations, received values replace the values held in the respective nodes' buffers. For example, FIG. 5. illustrates three nodes (N=3) 510 each buffering a respective set of input values. In a first iteration 520, the first node passes a first set of input values to a second node. The second node adds the set of input values received from the first node to corresponding input values held by the second node. The first node also receives a third set of input values from a third node. The first node adds the set of input values received from the third node to corresponding values held by the first node. The second and third nodes also pass and add corresponding sets of input values in the first iteration 520. In a second iteration 530, the first node passes a third set of input values to the second node, which the second node adds to corresponding values held by the second node.

The first node also receives a second set of values from the third node, which the first node adds to corresponding values held by the first node. The second and third nodes again pass and add corresponding sets of values in the second iteration 530. In a third iteration 540, the first node passes a second set of sum values to the second node, which the second node stores. The first node also receives a first set of sum values from the third node, which the first node stores. The second and third nodes also pass and store corresponding sets of the sum values. In a fourth iteration 550, the first node passes a first set of sum values to the second node, which the second node stores. The first node also received a third set of the sum values from the third node, which the first node stores. The second and third nodes also pass and store corresponding sets of the sum values. After the fourth iteration, each node has the set of sum values. If the buffer is large enough, the ring-based All_Reduce function illustrated in FIG. 5 can optimally utilize the available network of a distributed computing system.

However, there is a need for an improved chip-to-chip high-speed serial/deserialization (SerDes) interconnection so that such a distributed system for computing the All_Reduce function can be implemented within a cluster of chips instead of on distributed computers connected via slower ethernet, infiniband or the like communication links.

SUMMARY OF THE INVENTION

The present technology may best be understood by referring to the following description and accompanying drawings that are used to illustrate embodiments of the present technology directed toward topologies and algorithms for multi-processing unit interconnected acceleration systems.

In one embodiment, a compute system can include a plurality of parallel processing units (PPUs). The plurality of PPUs can be organized into a plurality of subsets of PPUs. Each PPU in each subset can be coupled to each of the other PPUs in the same subset of PPUs by a respective set of two bi-directional communication links. Each PPU can also be coupled to a corresponding PPU in a corresponding other of the subset of PPUs by a respective single bi-directional communication link.

In one embodiment, the plurality of PPUs can be configured to compute an All_Reduce function. To compute the All_Reduce function, each parallel processing unit can be configured to reduce a corresponding group of input data received on the respective two bi-directional communication links from the other parallel processing units in the same subset of parallel processing units. Each parallel processing unit can be configured to reduce a corresponding group of intermediate data received on the respective one bi-directional communication link from the corresponding parallel processing unit in the corresponding other subset of the parallel processing unit. Each parallel processing unit can be configured to broadcast a corresponding group of sum data on the respective two bi-directional communication links to the other parallel processing units in the same subset of parallel processing units.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Embodiments of the present technology are illustrated by way of example and not by way of limitation, in the figures of the accompanying drawings and in which like reference numerals refer to similar elements and in which.

DETAILED DESCRIPTION OF THE INVENTION

Figure 1:
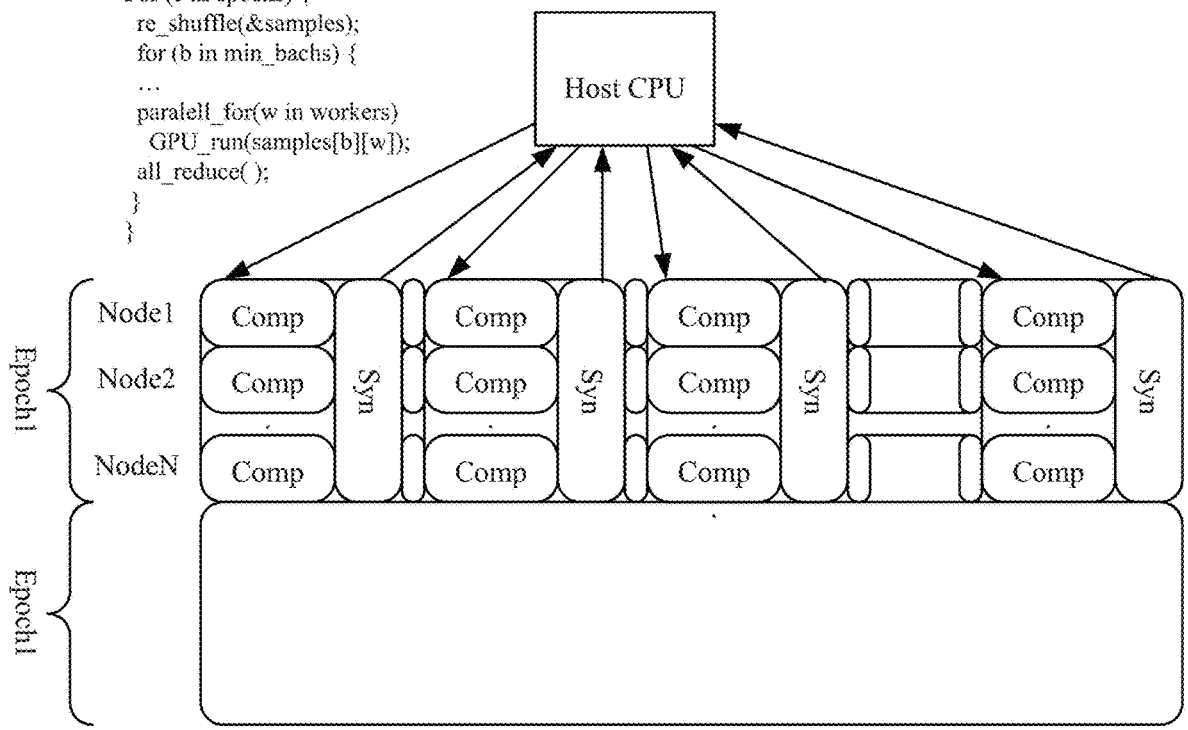
FIG. 1 shows an exemplary minibatch SDG process according to the conventional art.
Figure 2:
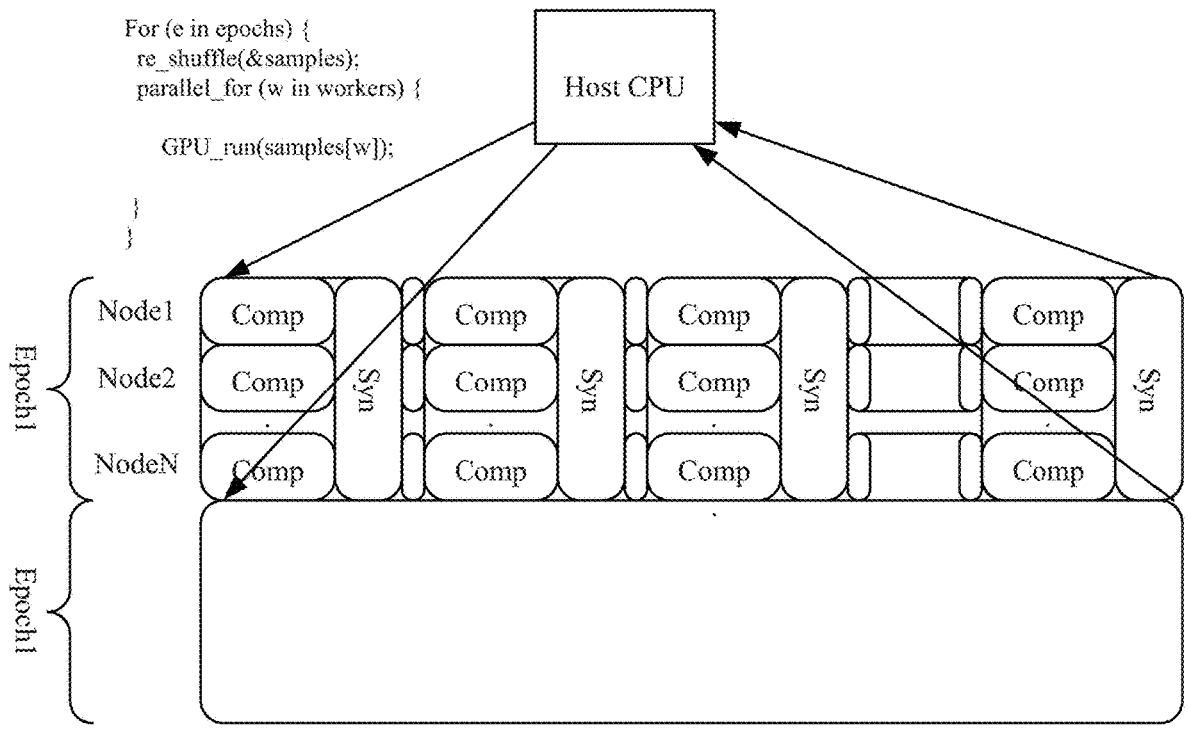
FIG. 2 shows another exemplary minibatch SDG process according to the conventional art.
Figure 3:
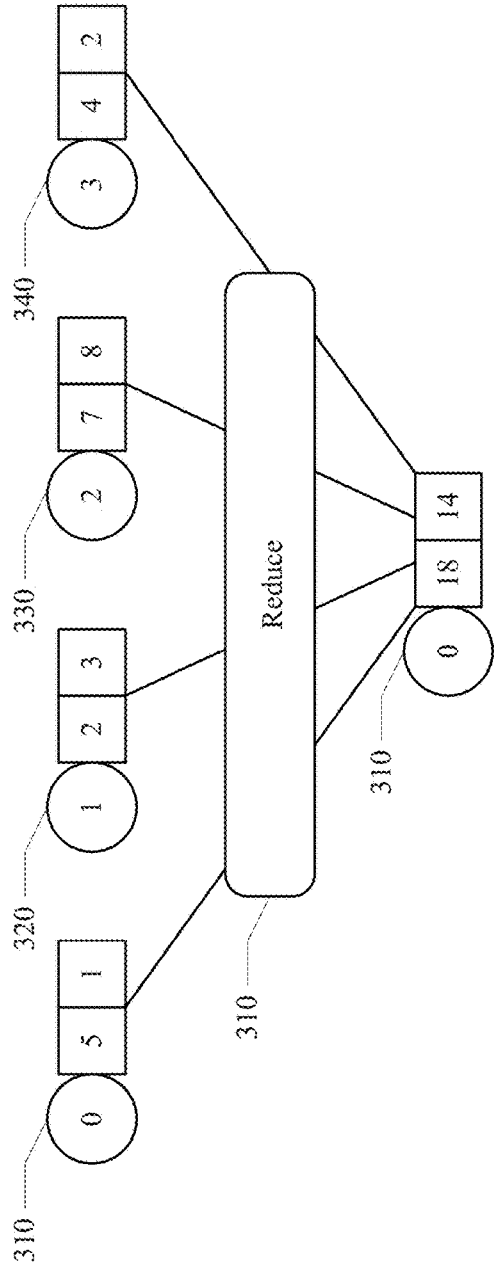
FIG. 3 illustrates computation of a Reduce function according to the conventional art.
Figure 4:
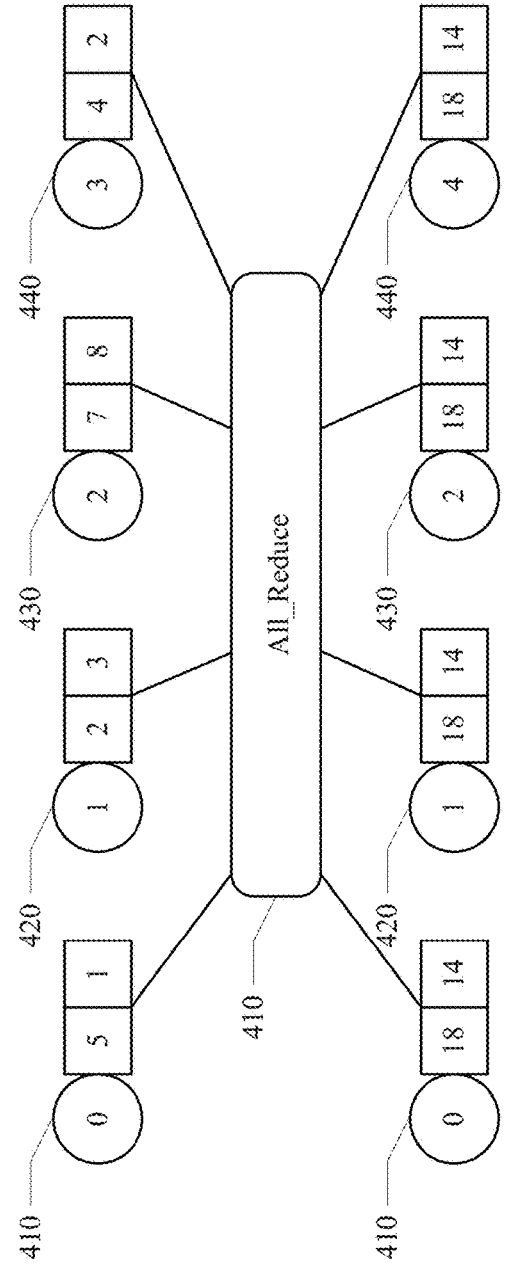
FIG. 4 illustrates computation of an All_Reduce function according to the conventional art.
Figure 5:
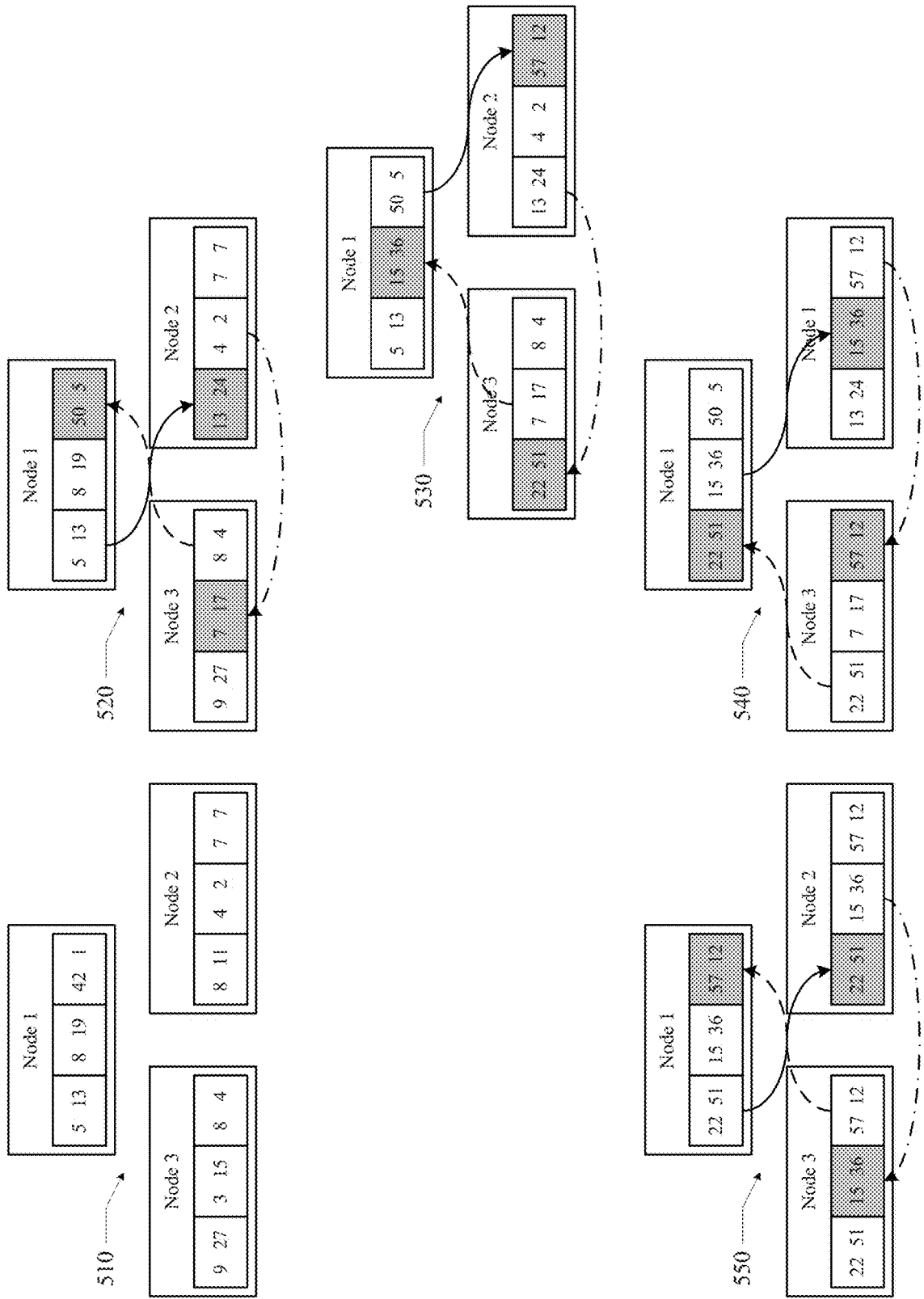
FIG. 5 illustrates a ring-based All_Reduce computation according to the conventional art.

Reference will now be made in detail to the embodiments of the present technology, examples of which are illustrated in the accompanying drawings. While the present technology will be described in conjunction with these embodiments, it will be understood that they are not intended to limit the technology to these embodiments. On the contrary, the invention is intended to cover alternatives, modifications and equivalents, which may be included within the scope of the invention as defined by the appended claims. Furthermore, in the following detailed description of the present technology, numerous specific details are set forth in order to provide a thorough understanding of the present technology. However, it is understood that the present technology may be practiced without these specific details. In other instances, well-known methods, procedures, components, and circuits have not been described in detail as not to unnecessarily obscure aspects of the present technology.

Some embodiments of the present technology which follow are presented in terms of routines, modules, logic blocks, and other symbolic representations of operations on data within one or more electronic devices. The descriptions and representations are the means used by those skilled in the art to most effectively convey the substance of their work to others skilled in the art. A routine, module, logic block and/or the like, is herein, and generally, conceived to be a self-consistent sequence of processes or instructions leading to a desired result. The processes are those including physical manipulations of physical quantities. Usually, though not necessarily, these physical manipulations take the form of electric or magnetic signals capable of being stored, transferred, compared and otherwise manipulated in an electronic device. For reasons of convenience, and with reference to common usage, these signals are referred to as data, bits, values, elements, symbols, characters, terms, numbers, strings, and/or the like with reference to embodiments of the present technology.

It should be borne in mind, however, that these terms are to be interpreted as referencing physical manipulations and quantities and are merely convenient labels and are to be interpreted further in view of terms commonly used in the art. Unless specifically stated otherwise as apparent from the following discussion, it is understood that through discussions of the present technology, discussions utilizing the terms such as "receiving," and/or the like, refer to the actions and processes of an electronic device such as an electronic computing device that manipulates and transforms data. The data is represented as physical (e.g., electronic) quantities within the electronic device's logic circuits, registers, memories and/or the like, and is transformed into other data similarly represented as physical quantities within the electronic device.

In this application, the use of the disjunctive is intended to include the conjunctive. The use of definite or indefinite articles is not intended to indicate cardinality. In particular, a reference to "the" object or "a" object is intended to denote also one of a possible plurality of such objects. The use of the terms "comprises," "comprising," "includes," "including" and the like specify the presence of stated elements, but do not preclude the presence or addition of one or more other elements and or groups thereof. It is also to be understood that although the terms first, second, etc. may be used herein to describe various elements, such elements should not be limited by these terms. These terms are used herein to distinguish one element from another. For example, a first element could be termed a second element, and similarly a second element could be termed a first element, without departing from the scope of embodiments. It is also to be understood that when an element is referred to as being "coupled" to another element, it may be directly or indirectly connected to the other element, or an intervening element may be present. In contrast, when an element is referred to as being "directly connected" to another element, there are not intervening elements present. It is also to be understood that the term "and or" includes any and all combinations of one or more of the associated elements. It is also to be understood that the phraseology and terminology used herein is for the purpose of description and should not be regarded as limiting.

Figure 6:
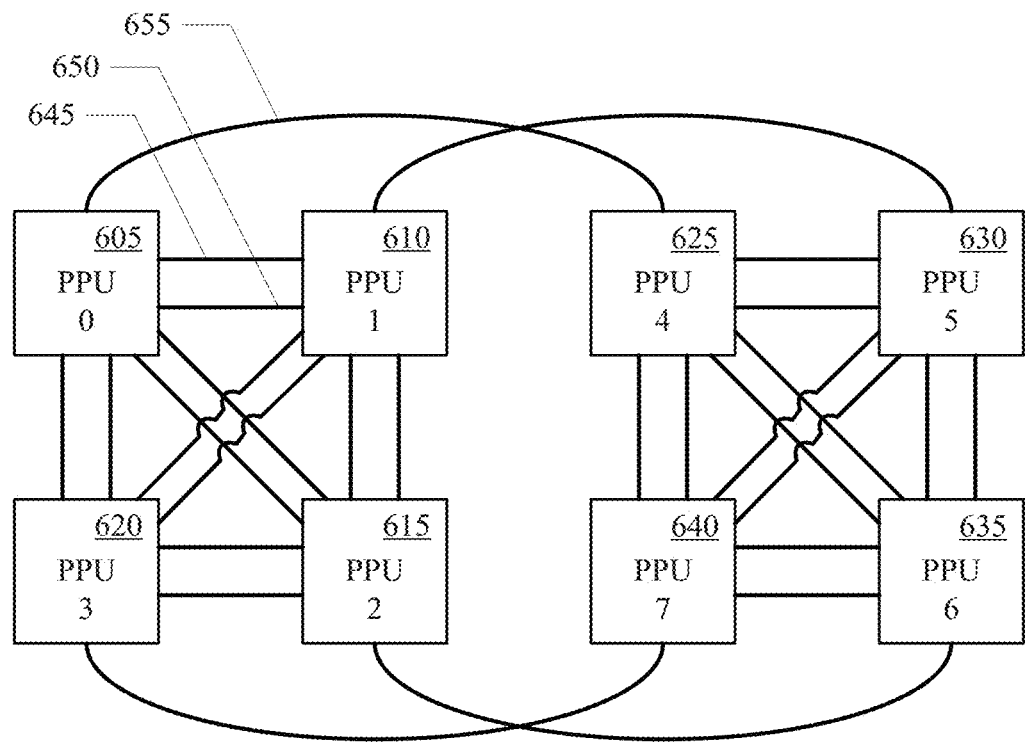
FIG. 6 shows a plurality of parallel processing units (PPUs), in accordance with aspects of the present technology.

Referring now to FIG. 6, a plurality of parallel processing units (PPUs), in accordance with aspects of the present technology, is shown. The plurality of PPUs can include eight PPUs. Each PPU can include seven communication ports. The eight PPUs can be organized in a first subset of four PPUs 605-620 and a second subset of four PPUs 625-640. Each PPU can be configurably couplable to each of the other PPUs in the same subset by two bi-directional communication links. For example, a first PPU 605 can be couplable to a second PPU 610 by two bi-directional configurable communication links 645, 650. The first PPU 605 can also be couplable to a third PPU 615 by another two bi-directional configurable communication links. The first PPU 605 can also be couplable to a fourth PPU 620 by yet another two bi-directional configurable communication links. Each PPU can also be configurable couplable to a corresponding PPU in the other subset by one bi-directional communication link. For example, the first PPU 605 in the first subset 605-620 can be couplable to a fifth PPU 625 in the second subset 625-640 by one bi-directional configurable communication link 655.

Figure 7:
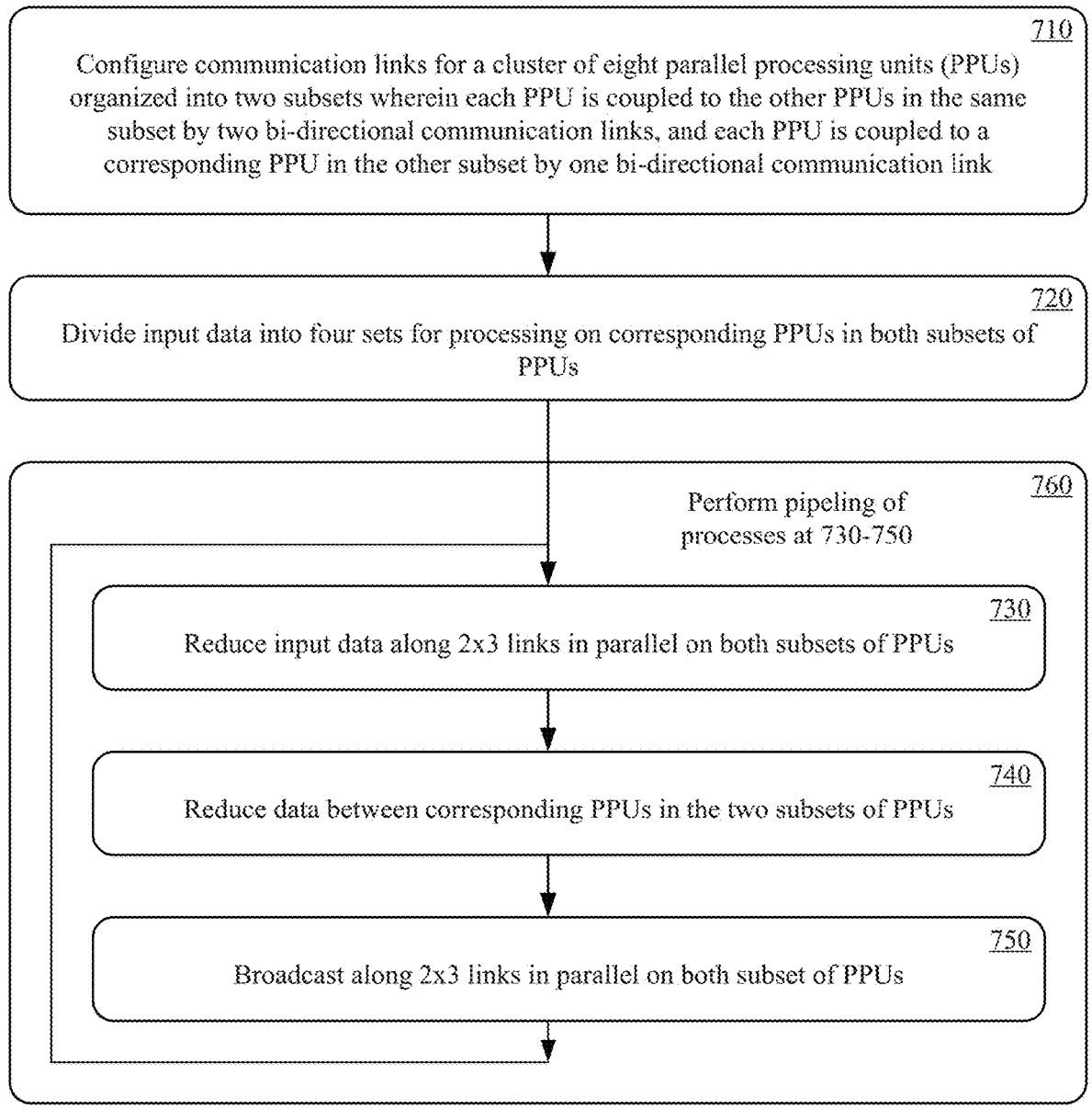
FIG. 7 shows a method of configuring a plurality of parallel processing unit (PPUs) to compute an All_Reduce function, in accordance with aspects of the present technology.

Referring now to FIG. 7, a method of configuring a plurality of parallel processing unit (PPUs) to compute an All_Reduce function, in accordance with aspects of the present technology, is shown. The method of configuring the plurality of PPUs to compute an All_Reduce function will be further explained with reference to FIGS. 8A-8C. The method can begin with configuring the communication links between the plurality of PPUs, at 710. A cluster of eight PPUs can be organized into two subsets of four PPUs each. Each PPU in a subset can be configured to be coupled to the other PPUs in the same subset by two bi-directional communication links. In addition, each PPU can be coupled to a corresponding PPU in the other subset by one bi-directional communication link. At 720, input data can be divided into four sets for processing on corresponding PPUs in both subsets of PPUs.

Figure 8A:
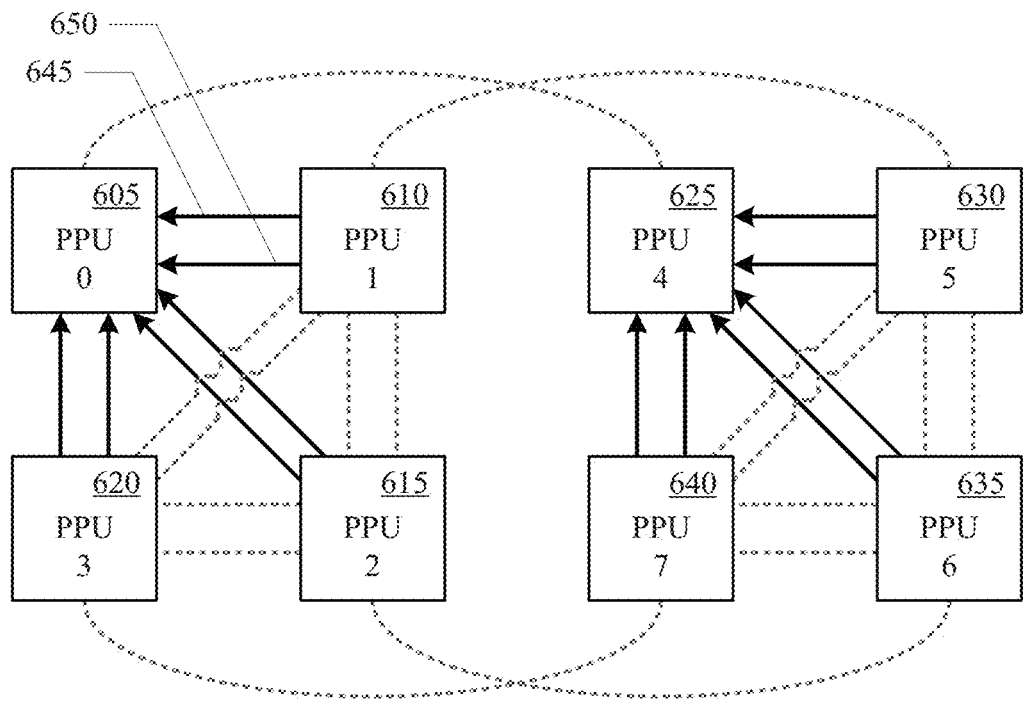
FIGS. 8A-8C illustrates execution of an All_Reduce function on a plurality of parallel processing unit (PPUs), in accordance with aspects of the present technology.

At 730, the input data can be reduced along three respective pairs of bi-directional communication links (2×3) links to each PPU from the other PPUs in both respective subsets of PPUs in parallel, as illustrated in FIG. 8A. For example, input data is received by the first PPU 605 from second PPU 610 on the corresponding pair of bi-directional communication links 645, 650. The input data is also received by the first PPU 605 from the third PPU 615, and from the fourth PPU 620. The respective data values of the input data received by the first PPU 605 from the second, third and fourth PPUs 610-620 are added to the respective data values of the input data of the first PPU 605 to generate a first set of intermediate data. The input data also similarly flows from the sixth, seventh and eighth PPUs 630-640 to the fifth PPU 625 in the second subset. The respective data values of the input data received by the fifth PPU 625 from the sixth, seventh and eighth PPUs 630-640 are added to the respective data values the input data of the fifth PPU 625 to generate a second set of the intermediate data. It is noted that the input data in this first phase of the All_Reduce function is received by the first PPU 605 and the fifth PPU 625 in a first direction on the corresponding six bi-directional communication links in each subset, as indicated by the direction of the arrows on the corresponding communication links in FIG. 8A. Although FIG. 8A illustrates the first portion of the reduction at the first PPU 605, corresponding first portions of the reduction are also performed at each of plurality of PPUs 605-640 for the same cycle.

Figure 8B:
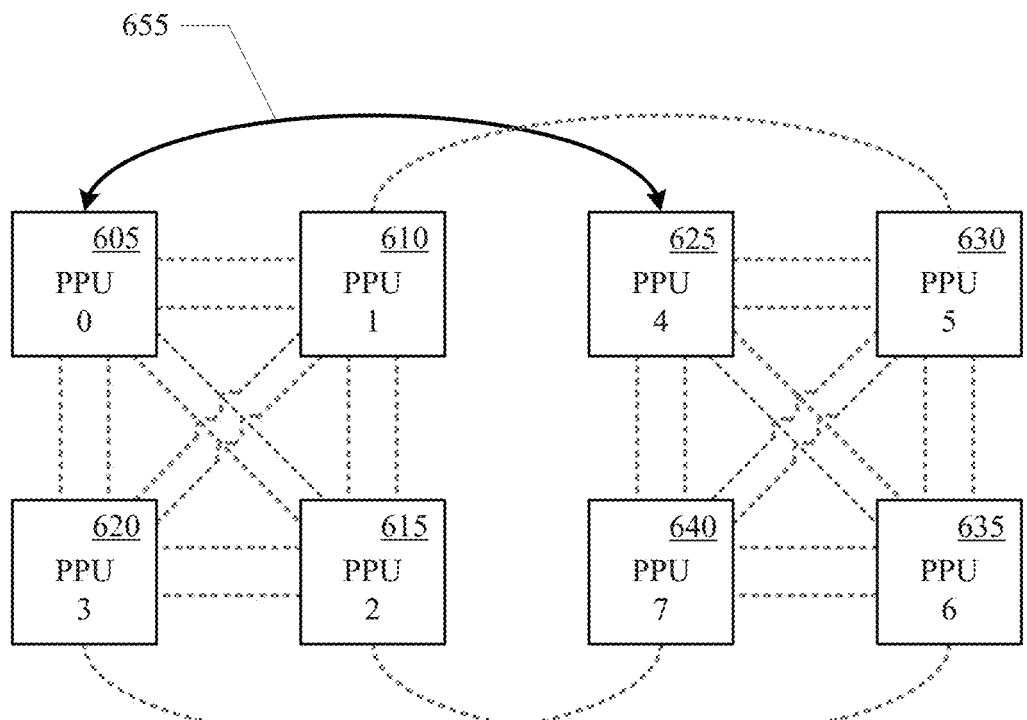

At 740, the intermediate data in the two subsets of PPUs is reduced in a butterfly exchange along the corresponding bi-directional communication links between the two subsets of PPUs, as illustrated in FIG. 8B. For example, a second set of the intermediate data is received by the first PPU 605 from the fifth PPU 625 on the corresponding bi-directional communication link 655 where the respective data values of the second set of the intermediate data are added to respective data values of the first set of the intermediate data to generate sum data at the first PPU 605. Likewise, the first set of the intermediate data is sent by the first PPU 605 to the fifth PPU 625 on the corresponding bi-directional communication link 655 where the respective data values of the first set of the intermediate data are added to respective data values of the second set of the intermediate data to generate the sum data at the second PPU 625. It is noted that the respective sets of the intermediate data in this second phase of the All_Reduce function are exchanged by the first PPU 605 and the fifth PPU 625 on the corresponding seventh bi-directional communication link 655, as indicated by the direction of the arrows on the corresponding communication link in FIG. 8B. Furthermore, although FIG. 8B illustrates the butterfly exchange of the intermediate data between the first PPU 605 and the fifth PPU 625, corresponding portions of the intermediate data are also butterfly exchanged between corresponding ones of the PPUs 605-640 in the different subsets of PPUs 605-620 and 625-640 in the same cycle. For example, the second PPU 610 in the first subset also butterfly exchanges corresponding portions of the intermediate data with the sixth PPU 630 in the second subset, and so on, in the same cycle.

Figure 8C:
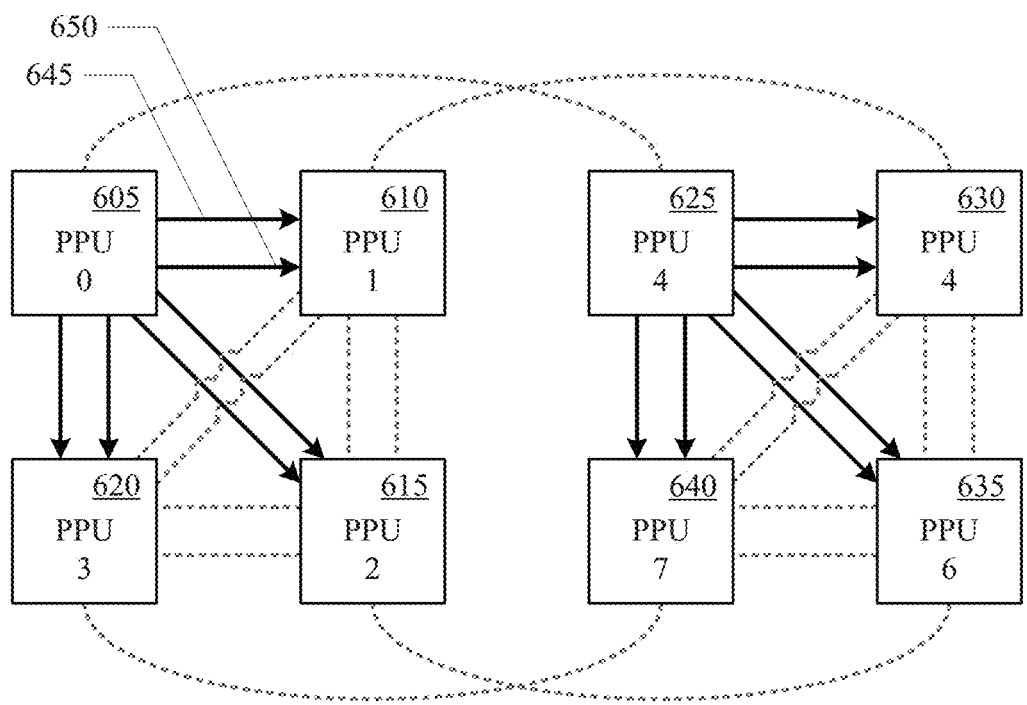

At 750, the sum data is broadcast along the three respective pairs of bi-directional communication links (2×3) links from each PPU to the other PPUs in both respective subsets of PPUs in parallel, as illustrated in FIG. 8C. For example, the sum data is sent by the first PPU 605 to the second PPU 610 on the corresponding pair of bi-directional communication links 645, 650. The sum data is also sent by the first PPU 605 to the third PPU 615 and fourth PPU 620. The sum data is also similarly broadcast from the fifth PPU 625 to the sixth, seventh and eighth PPUs 630-640 in the second subset. It is noted that the sum data in this third phase of the All_Reduce function is sent by the first PPU 605 and the fifth PPU 625 out in a second direction on the corresponding six bi-directional communication links in each subset, as indicated by the direction of the arrows on the corresponding communication links in FIG. 8C. Furthermore, although FIG. 8C illustrates the broadcast of the sum data by the first PPU 605, corresponding sum data is also broadcast from each of plurality of PPUs 605-640 to the other PPUs of the corresponding subsets for the same cycle.

Optionally, at 760, the processes at 730-750 can be pipelined. In one implementation, the four groups of input data can be further divided into N groups for execution of the processes at 730-750 over N iterations. For example, the PPUs 605-640 can be configured to perform a second iteration of the first phase performed by process 730, while also performing a first iteration of the second phase performed by process 440 in the same cycle, as illustrated in the second column of Table 1. Likewise, the PPUs 605-640 can be configured to perform a second iteration of the second phase performed by process 740 and a third iteration of the first phase performed by process 730, while also performing a first iteration of the third phase performed by process 750 in the same cycle.

TABLE 1

| Cycle 0 | Cycle 1 | Cycle 2 | Cycle 3 | Cycle 4 | Cycle 5 |
|---|---|---|---|---|---|
| It-1, Ph-1: IN on 6 links | It-1, Ph-2: IN/OUT on 7$^{th}$ link It-2, Ph-1: | It-1, Ph-3: OUT on 6 links It-2, Ph-2: | It-4, Ph-1: IN on 6 links It-2, Ph-3: | It-4, Ph-2: IN/OUT on 7$^{th}$ link It-5, Ph-1: | It-4, Ph-3: OUT on 6 links It-5, Ph-2: |

TABLE 1-continued

| Cycle 0 | Cycle 1 | Cycle 2 | Cycle 3 | Cycle 4 | Cycle 5 |
|---|---|---|---|---|---|
|  | IN on 6 links | IN/OUT on $7^{th}$ link It-3, Ph-1: IN on 6 links | OUT on 6 links It-3, Ph-2: IN/OUT on $7^{th}$ link | IN on 6 links It-3, Ph-3: OUT on 6 links | IN/OUT on $7^{th}$ link It-6, Ph-1: IN on 6 links |

In one implementation, the pipelining of the processes at 730-750 can be implemented in software. In most cases, the All_Reduce function is performed a large number of times, and therefore all seven of the communication ports of the PPUs 605-640 can be utilized in both direction in each cycle for substantially all iterations of the All_Reduce function. As a result, the bandwidth of all seven bi-directional communication interfaces of each PPU 605-640 can be fully utilized in substantially all cycles. Full utilization of all seven bi-directional communication interfaces of each PPU 605-640 can improve the performance of the computing platform. The inclusion of seven bi-directional communication interfaces in each PPU 605-640 can reduce the cost of the PPUs 605-640 as well as the computing system in which they are deployed, as compared to implementing eight bi-directional communication interfaces in each of the PPUs to increase communication bandwidth between the PPUs.

Figure 9:
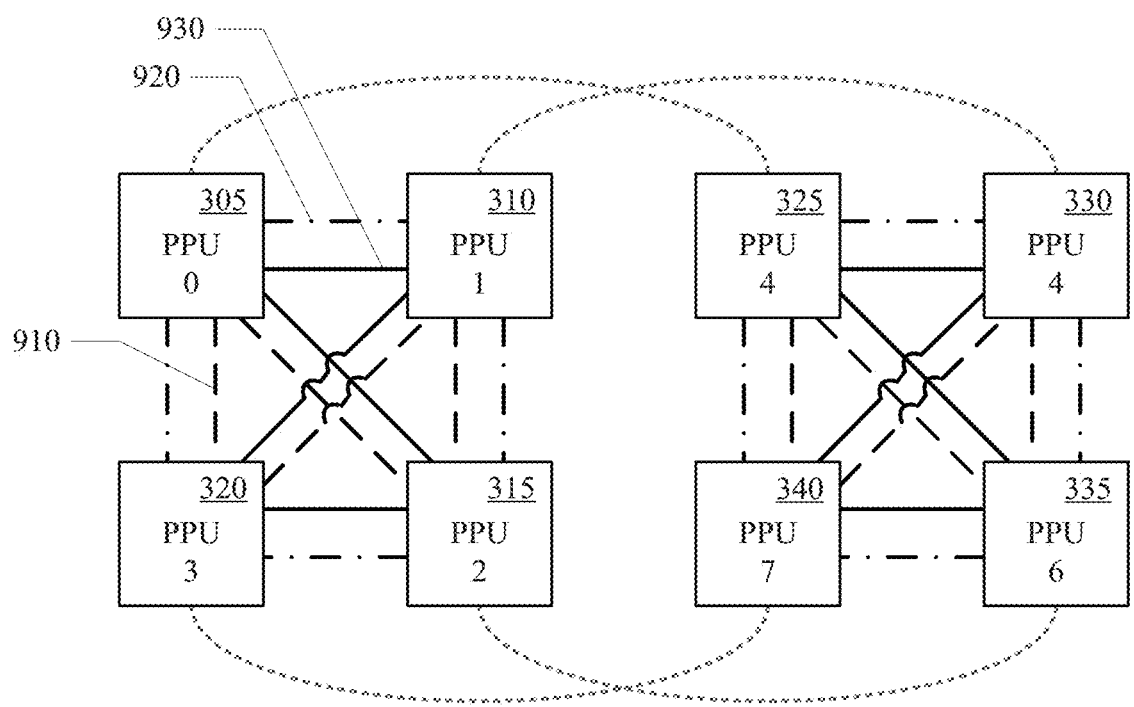
FIG. 9 shows a plurality of parallel processing units (PPUs) employing hierarchical scaling, in accordance with aspects of the present technology.

Referring now to FIG. 9, a plurality of parallel processing units (PPUs) employing hierarchical scaling, in accordance with aspects of the present technology, is shown. The plurality of PPUs can include eight PPUs Each PPU can include seven communication ports. The eight PPUs can be organized in a first subset of four PPUs 605-620 and a second set of four PPUs 625-640. Each PPU can be configurably couplable to each of the other PPUs in the same subset by two bi-directional communication links. For example, a first PPU 605 can be couplable to a second PPU 610 by two bi-directional configurable communication links 645, 650. The first PPU 605 can also be couplable to a third PPU 615 by another two bi-directional configurable communication links. The first PPU 605 can also be couplable to a fourth PPU 620 by another two bi-directional configurable communication links. Each PPU can also be configurable couplable to a corresponding PPU in the other subset by one communication link. For example, the first PPU 605 in the first subset 605-620 can be couplable to a fifth PPU 625 in the second subset 625-640 by one bi-directional configurable communication link 655.

In one embodiment, the plurality of PPUs 605-640 can be hierarchical scaled as two clusters of four PPUs each 605-620, 625-640. The bi-directional communication links in a cluster 605-620 can be configured as three bi-directional rings 910, 920, 930. The PPUs of a cluster 605-620 can be configured to compute an All_Reduce function in accordance with a parallel ring-All_Reduce algorithm. Hierarchical scaling the plurality of PPUs 605-640 can be advantageous when an application requires a smaller portion of the computational resources of the plurality of PPUs 605-640 that can be serviced by a cluster of the PPUs 605-620. Likewise, hierarchical scaling can be advantageously employed in a cloud computing platform to readily enable clients to purchase the computing bandwidth of a cluster of the PPUs 605-620 instead of the entire plurality of PPUs 605-640.

Figure 10:
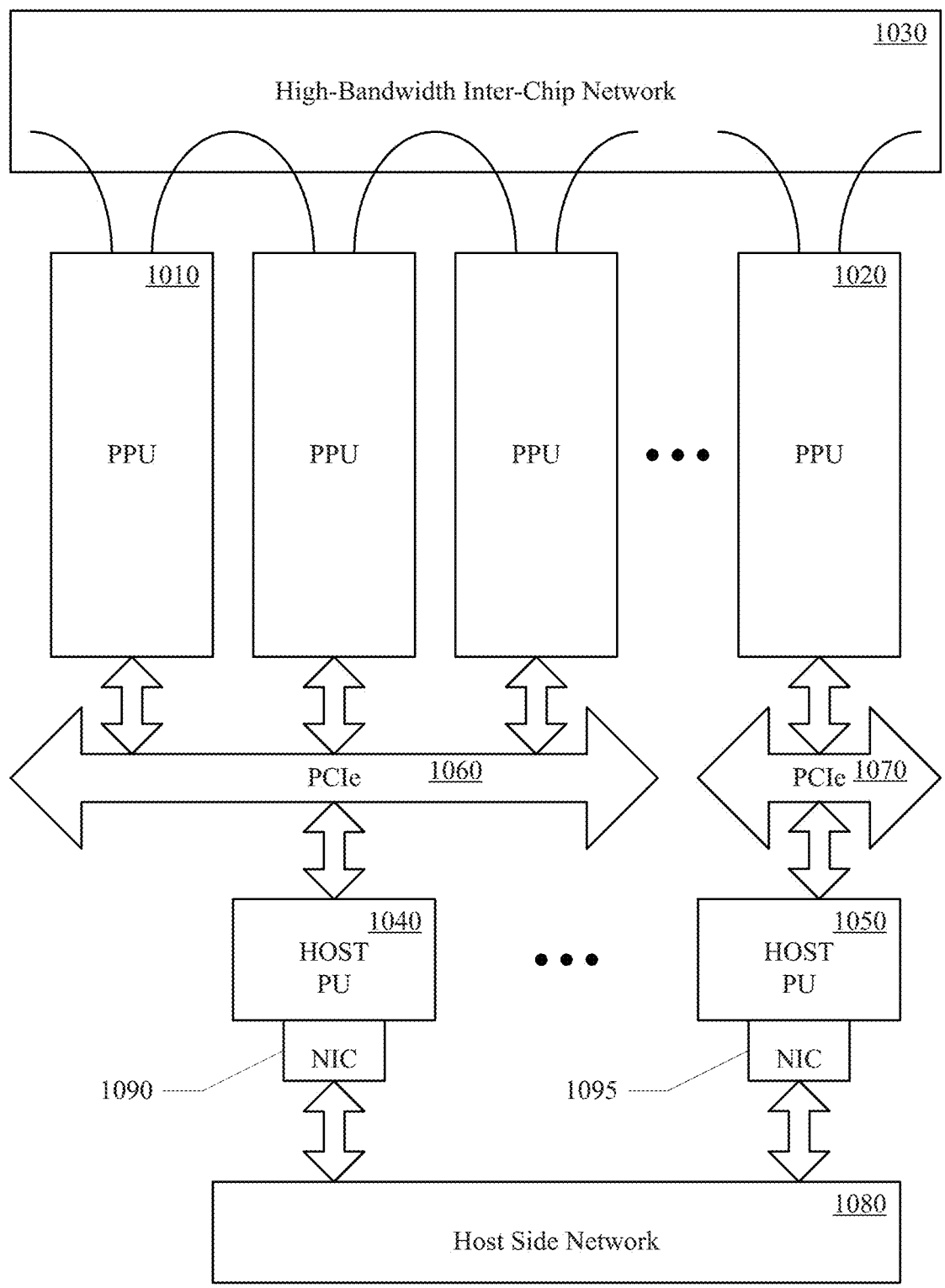
FIG. 10 shows an exemplary computing system include a plurality of parallel processing units (PPUs), in accordance with aspects of the present technology.

Referring now to FIG. 10, an exemplary computing system including a plurality of parallel processing units (PPUs), in accordance with aspects of the present technology, is shown. The exemplary computer system 1000 can include a plurality of parallel processing units (PPUs) 1010, 1020 coupled together by one or more high-bandwidth inter-chip networks 1030. The plurality of PPUs 1010, 1020 can be, but are not limited to, a plurality of neural processing accelerators. The PPUs 1010-1020 can also be coupled to a plurality of host processing units 1040, 1050 by one or more communication busses 1060, 1070. The one or more communications busses 1060, 1070 can be, but are not limited to, one or more peripheral component interface express (PCIe) busses. The one or more host processing units 1040, 1050 can be coupled to one or more host side networks 1080 by one or more network interface cards (NICs) 1090, 1095.

Figure 11:
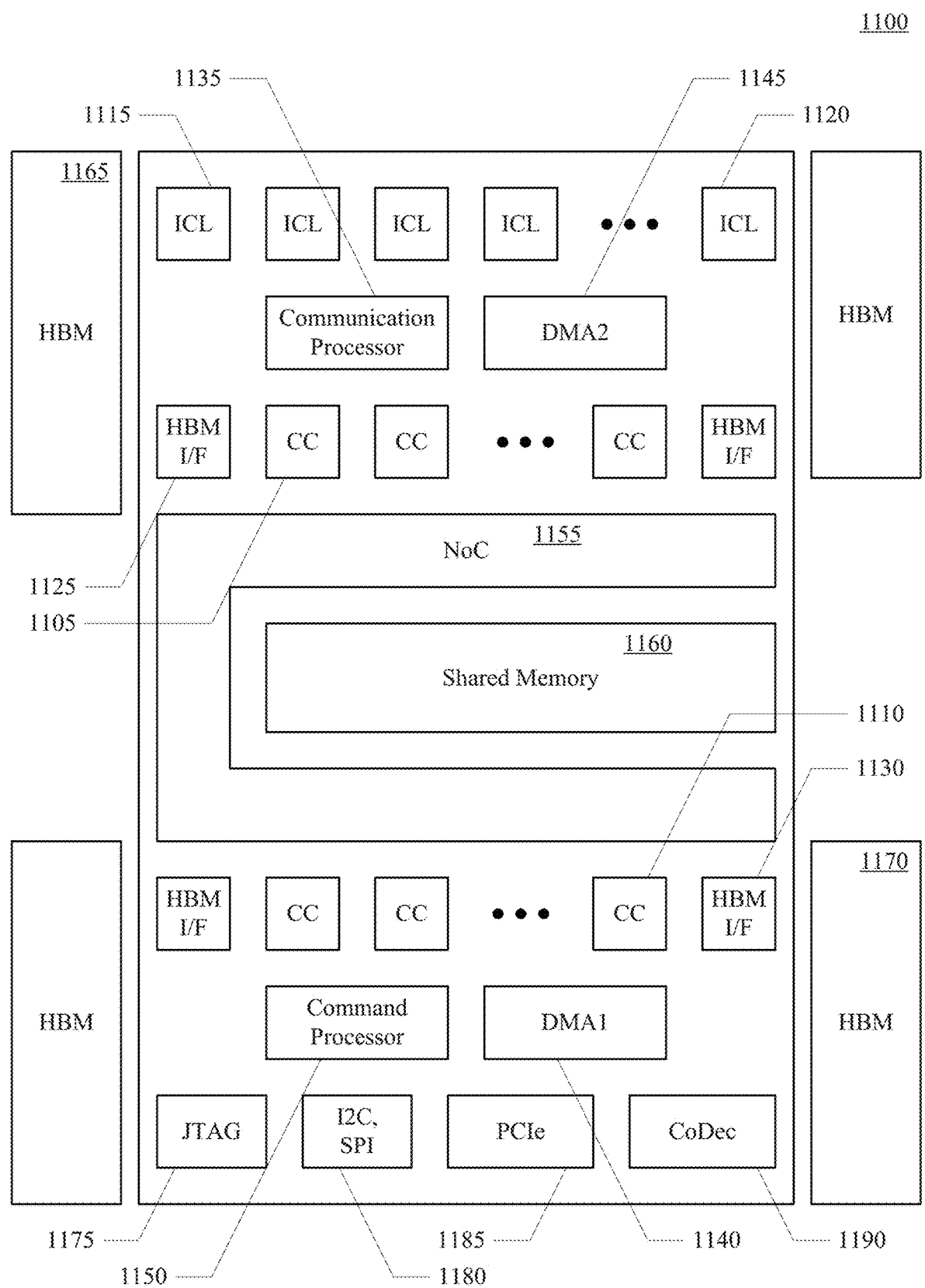
FIG. 11 shows an exemplar parallel processing unit (PPU), in accordance with aspects of the present technology.

Referring now to FIG. 11, an exemplary parallel processing unit (PPU), in accordance with aspects of the present technology, is shown. The PPU 1100 can include a plurality of compute cores 1105, 1110, a plurality of inter-chip links (ICL) 1115, 1120, one or more high-bandwidth memory interfaces (HBM U/F) 1125, 1130, one or more communication processors 1135, one or more direct memory access (DMA) controllers 1140, 1145, one or more command processors (CP) 1150, one or more networks-on-chips (NoCs) 1155, shared memory 1160, and one or more high-bandwidth memory (HBM) 1165, 1170. The PPU 1100 can also include one or more joint test action group (JTAG) engines 1175, one or more inter-integrated circuit ($I^2C$) interfaces and or serial peripheral interfaces (SPI) 1180, one or more peripheral component interface express (PCIe) interfaces 1185, one or more codecs (CoDec) 1190, and the like. In one implementation, the plurality of compute cores 1105, 1110, the plurality of inter-chip links (ICL) 1115, 1120, one or more high-bandwidth memory interfaces (HBM I/F) 1125, 1130, one or more communication processors 1135, one or more direct memory access (DMA) controllers 1140, 1145, one or more command processors (CP) 1150, one or more networks-on-chips (NoCs) 1155, shared memory 1160, one or more high-bandwidth memory (HBM) 1165, 1170, one or more joint test action group (JTAG) engines 1175, one or more inter-integrated circuit ($I^2C$) interfaces and or serial peripheral interfaces (SPI) 1180, one or more peripheral component interface express (PCIe) interfaces 1185, one or more codecs (CoDec) 1190, and the like can be fabricated in one monolithic integrated circuits (ICs)

The ICLs 1115, 1120 can be configured for chip-to-chip communication between a plurality of PPUs. In one implementation, the PPU 1100 can include seven ICLs 1115, 1120. The communication processor 1135 and direct memory access engines 1140, 1145 can be configured to coordinate data sent and received through the ICLs 1115, 1120. The network-on-chip (NoC) 1155 can be configured to coordinate data movement between the compute cores 1105, 1110 and the shared memory 1160. The communication processor 1135, direct memory access engines 1140, 1145, network on chip 1155 and high-bandwidth memory interfaces (HBM I/F) 1125, 1130 can be configured to coordinate movement of data between the high-bandwidth memory 1165, 1170, the shared memory 1160 and the ICLs 1115, 1120. The command processor 1150 can be configured to serve as an interface between the PPU 1100 and one or more host processing units. The plurality of the PPUs 1100 can advantageously employed to compute an All_Reduce function as described above with reference to FIGS. 6, 7, 8A-8C, and 9.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is intended that the scope of the invention be defined by the claims appended hereto and their equivalents.

What is claimed is:

1. A compute system comprising:
    a plurality of parallel processing units organized into a plurality of subsets of parallel processing units, wherein;
        each parallel processing unit in each subset is coupled to each of the other parallel processing units in the same subset of parallel processing units by two bi-directional communication links, and each parallel processing unit is coupled to a corresponding parallel processing unit of a corresponding other of the subset of parallel processing units by one bi-directional communication link; and
        the parallel processing unit and the bi-direction communication links are configured to compute an All Reduce function, comprising;
            each parallel processing unit configured to reduce a corresponding group of input data received on the respective two bi-directional communication links from the other parallel processing units in the same subset of parallel processing units;
            each parallel processing unit configured to reduce a corresponding group of intermediate data received on the respective one bi-directional communication link from the corresponding parallel processing unit in the corresponding other subset of the parallel processing unit; and
            each parallel processing unit configured to broadcast a corresponding group of sum data on the respective two bi-directional communication links to the other parallel processing units in the same subset of parallel processing units.

2. The compute system of claim 1, wherein:
    the plurality of parallel processing units comprise eight parallel processing units;
    the plurality of parallel processing units are organized into two subsets of four parallel processing units each;
    two bi-directional communication links couple each parallel processing unit to the other three parallel processing units in the same subset of parallel processing units; and
    one bi-directional communication link couples each parallel processing unit to a corresponding parallel processing unit is the other subset of parallel processing units.

3. The compute system of claim 2, wherein:
    input data is divided into four groups;
    each parallel processing unit is configured to sum corresponding groups of the input data received on the two bi-directional communication links from the other parallel processing units in the same subset with the group of input data of the respective parallel processing unit to generate a respective group of intermediate data;
    each parallel processing unit is configured to sum a corresponding group of intermediate data received on the one bi-directional communication link from the corresponding parallel processing unit in the other subset with the group intermediate data of the respective parallel processing unit to generate a respective group of sum data; and
    each parallel processing unit is configured to broadcast the sum data of the respective parallel processing unit to the other parallel processing units in the same subset.

4. The compute system of claim 3, further comprising pipelining multiple iterations of:
    summing the corresponding groups of the input data received on the two bi-directional communication links from the other parallel processing units in the same subset with the group of input data of the respective parallel processing unit to generate a respective group of intermediate data; and
    summing the corresponding group of intermediate data received on the one bi- directional communication link from the corresponding parallel processing unit in the other subset with the group intermediate data of the respective parallel processing unit to generate a respective group of sum data;
    with broadcasting the sum data of the respective parallel processing unit to the other parallel processing units in the same subset.

5. A compute method comprising:
    configuring communication links for a cluster of eight parallel processing units organized into two subsets, wherein each parallel processing unit is coupled to each of the other parallel processing units in the same subset by two bi-directional communication links, and each parallel processing unit is coupled to a corresponding parallel processing unit in the other subset by one bi-directional communication link;
    dividing input data into four sets for processing on corresponding parallel processing units in both subsets of parallel processing units;
    reducing the input data along 2×3 of the bi-directional communication links in parallel on both subset of parallel processing units;
    reducing data between corresponding parallel processing units in the two subsets of parallel processing units; and
    broadcasting data along 2×3 of the bi-directional communication links in parallel on both subset of the parallel processing units.

6. The compute method according to claim 5, further comprising:
    dividing the input data into a multiple groups of four sets for processing on corresponding parallel processing units in both subsets of the parallel processing units;
    pipelining the multiple groups of the four sets of data over multiple iterations of:
        reducing the input data along 2×3 links in parallel on both subset of parallel processing units;
        reducing the data between corresponding parallel processing units in the two subsets of parallel processing units; and
        broadcasting the data along the 2×3 lines in parallel on both subset of parallel processing units.

7. The compute method according to claim 5, wherein:
    reducing the input data along 2×3 links in parallel on both subset of parallel processing units includes receiving corresponding input data by each parallel processing unit from each of the other parallel processing units in the same subset of parallel processing units and summing the corresponding received input data with the input data of the respective receiving parallel processing unit to generate partial sum data;

reducing the data between corresponding parallel processing units in the two subsets of parallel processing units includes receiving corresponding partial sum data by each parallel processing unit from corresponding parallel processing units in the other subset of parallel processing units and summing the corresponding received partial sum data with the partial sum data of the respective receiving parallel processing unit to generate sum data; and broadcasting the data along the 2×3 lines in parallel on both subset of parallel processing units includes sending the sum data from each of the parallel processing units to the other parallel processing units in the same subset of parallel processing units.

8. One or more non-transitory computing device readable media having instructions stored thereon that when executed by one or more processing units to perform a method comprising:

configuring communication links for a cluster of eight parallel processing units organized into two subsets;

configuring each parallel processing unit in the same subset to be coupled to each of the other parallel processing units in the same subset by two bi-directional communication links;

configuring each parallel processing unit to be coupled to a corresponding parallel processing unit in the other subset by one bi-directional communication link;

dividing input data into four sets for processing on corresponding parallel processing units in both subsets of parallel processing units;

reducing the input data along 2×3 of the bi-directional communication links in parallel on both subset of parallel processing units;

reducing data between corresponding parallel processing units in the two subsets of parallel processing units; and broadcasting data along 2×3 of the bi-directional communication links in parallel on both subset of the parallel processing units.

9. The one or more non-transitory computing device readable media having instructions stored thereon that when executed by the one or more processing units perform the method of claim 8, further comprising:

dividing the input data into a multiple groups of four sets for processing on corresponding parallel processing units in both subsets of the parallel processing units;

pipelining the multiple groups of the four sets of data over multiple iterations of:
reducing the input data along 2×3 links in parallel on both subset of parallel processing units;
reducing the data between corresponding parallel processing units in the two subsets of parallel processing units; and
broadcasting the data along the 2×3 lines in parallel on both subset of parallel processing units.

10. The one or more non-transitory computing device readable media having instructions stored thereon that when executed by the one or more processing units perform the method of claim 8, further comprising:

wherein:

reducing the input data along 2×3 links in parallel on both subset of parallel processing units includes receiving corresponding input data by each parallel processing unit from each of the other parallel processing units in the same subset of parallel processing units and summing the corresponding received input data with the input data of the respective receiving parallel processing unit to generate partial sum data;

reducing the data between corresponding parallel processing units in the two subsets of parallel processing units includes receiving corresponding partial sum data by each parallel processing unit from corresponding parallel processing units in the other subset of parallel processing units and summing the corresponding received partial sum data with the partial sum data of the respective receiving parallel processing unit to generate sum data; and broadcasting the data along the 2×3 lines in parallel on both subset of parallel processing units includes sending the sum data from each of the parallel processing units to the other parallel processing units in the same subset of parallel processing units.

* * * * *